（12）United States Patent
Steudel et al.

(10) Patent No.: US 8,143,734 B2
(45) Date of Patent: Mar. 27, 2012

(54) WIND PLANT AND METHOD OF INITIATING BRAKING ACTIONS IN DIFFERENT OPERATING MODES

(75) Inventors: Dirk Steudel, Kiel (DE); Martin Von Mutius, Ascheffel (DE)

(73) Assignee: Repower Systems AG, Hamburg (DE)

( * ) Notice: Subject to any disclaimer, the term of this patent is extended or adjusted under 35 U.S.C. 154(b) by 403 days.

(21) Appl. No.: 12/398,727

(22) Filed: Mar. 5, 2009

(65) Prior Publication Data

US 2009/0224543 A1 Sep. 10, 2009

(30) Foreign Application Priority Data

Mar. 6, 2008 (DE) .......................... 10 2008 012 957

(51) Int. Cl.
*H02P 9/04* (2006.01)
*F03D 9/00* (2006.01)
(52) U.S. Cl. ................. 290/44; 290/55; 290/43; 290/54
(58) Field of Classification Search ..................... 290/44, 290/55, 43, 54; *F03D 9/00; H02P 9/04*
See application file for complete search history.

(56) References Cited

U.S. PATENT DOCUMENTS

| | | | | | |
|---|---|---|---|---|---|
| 4,018,045 | A | * | 4/1977 | Greune et al. | 60/39.281 |
| 4,435,647 | A | * | 3/1984 | Harner et al. | 290/44 |
| 5,561,358 | A | * | 10/1996 | Kuwabara et al. | 318/799 |
| 5,779,446 | A | * | 7/1998 | Althof et al. | 416/36 |
| 7,504,738 | B2 | * | 3/2009 | Barton et al. | 290/44 |
| 7,586,206 | B2 | * | 9/2009 | Barton et al. | 290/44 |
| 2002/0000723 | A1 | | 1/2002 | Weitkamp | |
| 2003/0102833 | A1 | * | 6/2003 | Murakami | 318/362 |
| 2006/0002797 | A1 | * | 1/2006 | Moroz et al. | 416/98 |
| 2007/0018457 | A1 | | 1/2007 | Llorente Gonzalez | |
| 2007/0216164 | A1 | * | 9/2007 | Rivas et al. | 290/44 |
| 2008/0075597 | A1 | * | 3/2008 | Brocklehurst | 416/147 |
| 2008/0290664 | A1 | | 11/2008 | Kruger | |

(Continued)

FOREIGN PATENT DOCUMENTS

CA 2633927 7/2007

(Continued)

OTHER PUBLICATIONS

Machine translation of WO2007082642, Method of operating a wind installation, Steiner et al., Jul. 2007.*

(Continued)

*Primary Examiner* — Quyen Leung
*Assistant Examiner* — Terrance Kenerly
(74) *Attorney, Agent, or Firm* — Rankin, Hill & Clark LLP

(57) ABSTRACT

A method for the operation of a wind power plant (10) with a rotor (12), which has at least one angle-adjustable rotor blade (14), wherein the wind power plant (10) is operated in a first operating mode (71) and/or a second operating mode (75). In the first operating mode (71) a braking process of the rotor (12) is initiated when a rotational speed of the rotor (12) is exceeded, which lies above a first rotational speed threshold value. Also, a method for the operation of a wind power plant (10) with a rotor (12), which has at least one angle-adjustable rotor blade (14), wherein an operating parameter is monitored and a braking process of the rotor (12) is initiated when an operating parameter threshold value is reached.

26 Claims, 7 Drawing Sheets

U.S. PATENT DOCUMENTS

| | | | |
|---|---|---|---|
| 2009/0224543 A1* | 9/2009 | Steudel et al. | 290/44 |
| 2011/0135470 A1* | 6/2011 | Merkel | 416/1 |

FOREIGN PATENT DOCUMENTS

| | | |
|---|---|---|
| DE | 10141098 A1 | 3/2003 |
| DE | 102004054608 A1 | 3/2006 |
| DE | 102005034899 A1 | 2/2007 |
| DE | 102006001613 A1 | 7/2007 |
| DE | 102006001613 A1 | 7/2007 |
| EP | 1612414 A2 | 1/2006 |
| WO | 2005/116445 A1 | 12/2005 |
| WO | WO2007012487 * | 2/2007 |
| WO | WO2007082642 * | 7/2007 |
| WO | 2008/009354 A2 | 1/2008 |

OTHER PUBLICATIONS

Machine translation of WO2007012487, Wind power plant comprising individual pitch devices, Krueger, Feb. 2007.*

Heier, Siegfried; "Windkraftanlagen, Systemauslegung, Netzintegration and Regelung" (Wind Power Plants, System Design, Grid Integration and Control); 4th Edition, B.G. Teubner-Verlag/ GWV Fachverlage GmbH, Wiesbaden, Germany; Feb. 2005; (Discussed on p. 17 of Specification).

Eric Hau, Power and Speed Control by Means of Rotor Blade Pitching, pp. 363-365 (English translation included).

* cited by examiner

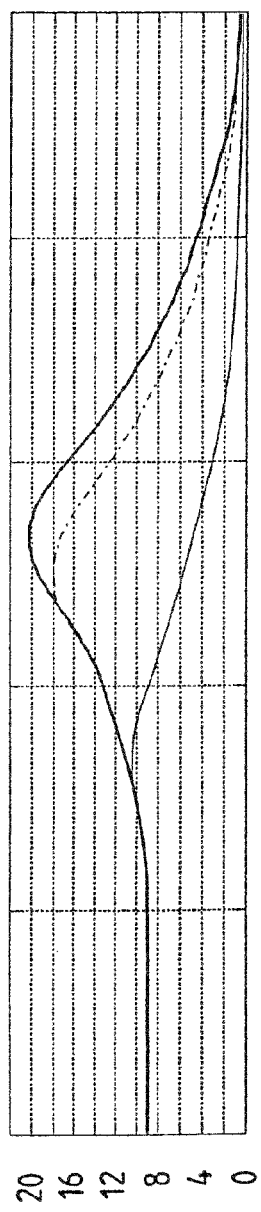
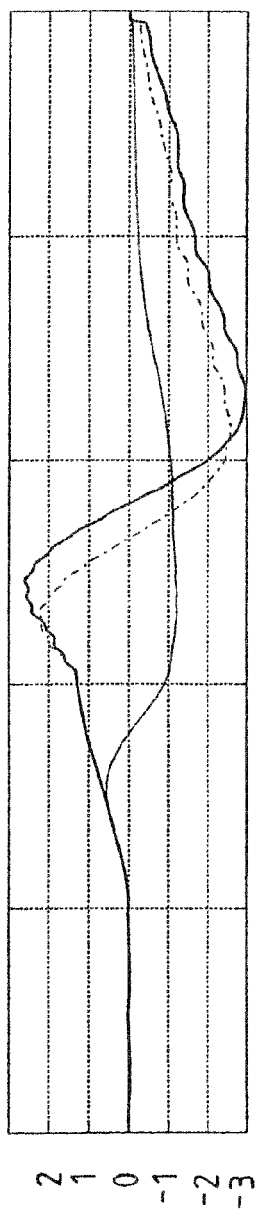
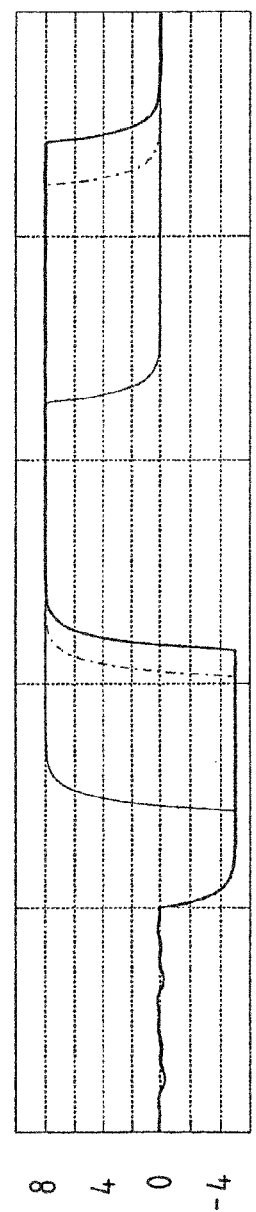
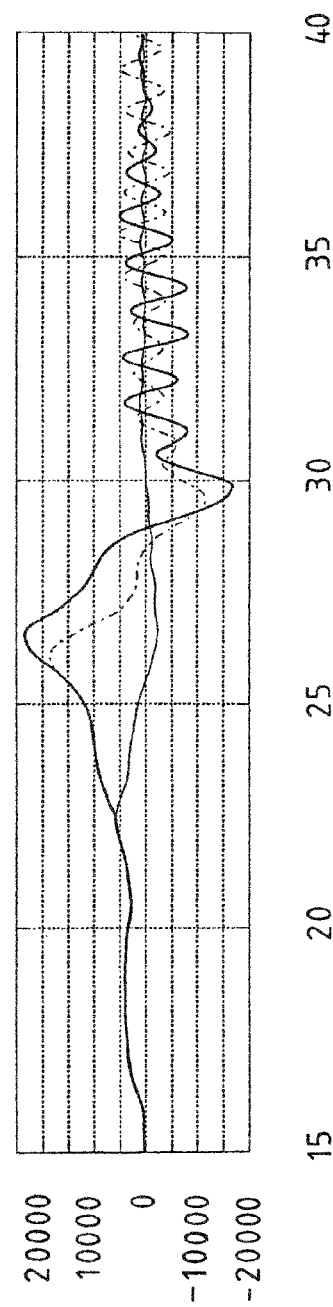
Fig. 5a
Fig. 5b
Fig. 5c
Fig. 5d

WIND PLANT AND METHOD OF INITIATING BRAKING ACTIONS IN DIFFERENT OPERATING MODES

BACKGROUND OF THE INVENTION

1. Field of the Invention

The invention relates to a method for the operation of a wind power plant with a rotor, which has at least one angle-adjustable rotor blade, wherein the wind power plant is operated in a first operating mode and/or a second operating mode, wherein in the first operating mode a braking process of the rotor is initiated when a speed of the rotor is exceeded, which lies above a first rotational speed threshold value.

The invention also relates to a method for the operation of a wind power plant with a rotor, which has at least one angle-adjustable rotor blade, wherein an operating parameter is monitored and a braking process of the rotor is initiated when an operating parameter threshold value is reached.

The invention also relates to a wind power plant with a rotor, which has at least one angle-adjustable rotor blade, wherein the wind power plant comprises an operating control system, which allows for at least a first operating mode and a second operating mode, wherein a safety system is provided for the monitoring of at least one operating parameter, wherein the safety system in the operating control system delivers a signal for the braking of the rotor and/or initiates the braking of the rotor as soon as the at least one operating parameter reaches an operating parameter threshold value, wherein the first operating mode is a performance-optimized normal operation and the second operating mode is a rotational-speed-reduced and/or performance-reduced operating mode.

2. Description of Related Art

Corresponding methods and a corresponding wind power plant are for example known from DE 10 2006 001 613 A1.

Wind power plants normally have an operating control system, which controls and/or regulates the operating control of wind power plants and also takes over the control and/or regulation in different operating states. If the operating control system fails, a safety system, that is independent of the operating control system, ensures that the wind power plant remains in a safe state. In the state of the art, this safety system is adjusted for an operating mode of the wind power plant with a rated speed or performance-optimized normal operation.

A wind power plant is also operated under certain circumstances in another operation mode, which is in particular rotational-speed- and/or performance-reduced. This hereby involves, for example, a sound-reduced operation, a performance limitation based on maintenance or repair work or operation in the case of a limited network capacity, in the case of which, for example, the potential power from the wind power plant cannot be released completely into the network. In particular, in the case of the other operating state or the second operating mode outside of the operation with a rated speed or an operation, which can also be described as performance-optimized normal operation, there can be load cases or disturbances, which can lead to damage to the wind power plant.

For this reason, the object of the present invention is to improve the operating safety of a wind power plant and to reduce the load on a wind power plant, in particular in an operating mode outside of a performance-optimized normal operation.

BRIEF SUMMARY OF THE INVENTION

This object is solved by a method for the operation of a wind power plant with a rotor, which has at least one angle-adjustable rotor blade, wherein the wind power plant is operated in a first operating mode and/or a second operating mode, wherein in the first operating mode, a braking process of the rotor is initiated when a rotational speed of the rotor is exceeded, which lies above a first rotational threshold value and wherein in the second operating mode a braking process of the rotor is initiated when the rotational speed of the rotor is greater than a second rotational speed threshold value, wherein the second rotational speed threshold value is less than the first rotational speed threshold value and/or wherein in the first and/or second operating mode a braking process of the rotor is initiated when a rotor acceleration prevails that is greater than a rotor acceleration threshold value.

It has been identified according to the invention that through the reduction of a rotational speed threshold value, as of the reaching of which a braking process of the rotor, whether it be through the shifting of the rotor blade adjustment angle in the direction of a feathering position or through the engagement of a mechanical brake or through other braking measures, in a second operating mode, which is preferably a rotational-speed and/or performance-reduced mode, this leads to the a considerably increased operating safety of a wind power plant. Alternatively or additionally to this, a rotor acceleration threshold value or a monitoring of a rotor acceleration threshold value is introduced so that as of the reaching of a rotor acceleration that is greater than the rotor acceleration threshold value a corresponding braking process of the rotor is performed. According to the invention, the operating safety of the wind power plant is also hereby considerably increased.

The first operating mode is preferably a performance-optimized normal operation of the wind power plant, i.e. corresponds with an operation of the wind power plant with a rotational speed characteristic line, which is provided in the case of the design of a wind power plant as a rotational speed characteristic line for maximum power output. As a rule, this is documented by a licensing authority in a type test and is correspondingly certified.

The rotational speed characteristic line is a characteristic line in a functionality of the rotational speed depending on the performance or the torque or vice versa of the performance depending on the rotational speed or the torque depending on the rotational speed. This characteristic line, and thus, the performance-optimized normal mode can apply in both the partial-load and the full-load range, wherein a constant rotational speed is generally set in the full-load range. In particular, in the transition area from the partial to full load, operating states can occur in the wind power plant that put a considerable strain on systems. This type of failure is for example an operating control error, which ensures that the rotor blade adjustment angle is moved towards 0°, i.e. to a maximum contact or working surface with respect to the blowing wind. If this occurs and the rotational speed threshold value is not reduced with respect to the performance-optimized normal operation or no corresponding specifiable rotor acceleration threshold value is provided, the failure is identified too late by the safety system and very high loads can act on the wind power plant. Within the scope of the invention, the rotor acceleration threshold value is preferably specifiable and/or the first and/or second rotational speed threshold value is specifiable.

The method is particularly preferably further established in that a rotor blade angle adjustment rate, in particular in the second operating mode, is also monitored. For example, it can hereby be monitored whether the operating control error just described occurs such that the rotor blade adjustment angle is moved towards 0°. In this case, the rotor blade angle adjustment rate is defined as negative. As of a certain negative rotor blade angle adjustment rate, a braking process, preferably a braking process of the rotor, can also be initiated when the rotor blade angle adjustment rate has reached a rotor blade adjustment rate threshold value. This monitoring of the rotor blade angle adjustment rate serves above all to define the operating state of the wind power plant in order to exclude that the wind power plant is e.g. currently in a start or stop or switching process or in transient operation due to extreme turbulence, during which great rotor accelerations can also take place, but which can then be compensated through a blade adjustment with a high positive blade adjustment rate.

The braking process is preferably initiated in the case of the combination of the reaching of the rotor blade angle adjustment rate threshold value through the monitoring of the rotor blade angle adjustment rate with an exceedance of the second rotational speed threshold value by the rotational speed of the rotor and/or with an exceedance of the rotor acceleration threshold value by the rotor acceleration. This makes possible an even more secure operating procedure for a wind power plant. The rotor blade angle adjustment rate threshold value is, for example, reached when a negative rotor blade angle adjustment rate is reached, the amount of which is greater than or equal to the amount of a negative threshold value. If the threshold value is e.g. −1.5°, it is reached when the angle adjustment rate is −1.5° or less (for example −1.51°), i.e. an adjustment towards a blade angle of 0°.

The rotor blade angle adjustment rate threshold value is preferably adjusted depending on the rotor acceleration threshold value and/or the second rotational speed threshold value. The rotor acceleration threshold value is preferably adjusted depending on the rotor blade angle adjustment rate threshold value and/or the second rotational speed threshold value.

The second rotational speed threshold value is preferably adjusted depending on the rotor acceleration threshold value and/or the rotor blade angle adjustment rate threshold value. The system load can be reduced considerably through adjustment of the corresponding threshold values. For example, the rotor acceleration threshold value can be set somewhat higher, while the second rotational speed threshold value or the amount of the, in particular negative, pitch rate or rotor blade angle adjustment rate is set somewhat lower. This can also take place the other way around. The rotor acceleration value can also be set somewhat higher, while the amount of the negative rotor blade adjustment rate is set somewhat lower.

The object is also solved by a method for the operation of a wind power plant with a rotor, which has at least one angle-adjustable rotor blade, wherein an operating parameter is determined through a recording process and is monitored, in particular through a safety system independent of an operating control system, and upon reaching an operating parameter threshold value, a braking process of the rotor is initiated, wherein in an operating mode outside of a performance-optimized normal mode of the wind power plant the operating parameter threshold value and/or the recording process is adjusted in order to determine the operating parameter.

According to the invention, the wind power plant reaches a safe operation of the wind power plant through the adjustment of the operating parameter threshold value. The adjustment of the operating parameter threshold value can, for example, be understood as a reduction of the rotational speed threshold value or a reduction or also increase of a rotor acceleration threshold value or the changing of a rotor blade angle adjustment rate threshold value. Within the scope of the invention, the adjustment of an operating parameter threshold value is understood, in particular, as a change in the threshold value relative to the threshold value during performance-optimized normal operation. Since this concerns safety-relevant threshold values, the possible threshold value adjustments are clearly determined in advance, e.g. in the form of value tables or mathematical functions, such as linear or quadratic functions.

Within the scope of the invention, the adjustment of the recording process of the operating parameter is understood, in particular, as a changing of the filtering and/or averaging process during the recording of the operating parameter. If the operating parameter is for example the rotational speed, the adjustment of the recording process can be a reduction of the average time within the scope of the invention. If in normal operation, for example, the rotational speed is recorded as 5 s. average, this can however occur in the rotational-speed-reduced operation, for example, as 50 ms. average, so that the adjustment of the recording process during a sudden rotational speed increase has similar effect on the operation of the wind power plant like a clear reduction of the rotational threshold value in the rotational-speed-reduced operation.

According to the invention, this is based on the realization that a change in the recording process of an operating parameter for an unchanged operating parameter threshold value has a corresponding effect on the operation of the wind power plant in comparison to an adjustment of the operating parameter threshold value without a change in the recording process. When the adjustment of the threshold value is discussed below, it should thus include the adjustment of the recording process without it being explicitly mentioned.

Within the scope of the invention, an operating mode outside of the performance-optimized normal operation is an operating mode of an operation with a rotational speed characteristic line, which is provided outside of a rotational speed characteristic line, which is provided for maximum power output. In particular, this means that, in a functional connection of the rotational speed over the power or the rotational speed over the torque, a mode is provided below this rotational speed characteristic line for maximum power output. This mode is preferably a mode in which max. 95% of the rotational speed is achieved with corresponding power or corresponding torque.

Furthermore, an operating mode outside of the performance-optimized normal operation can also be a simple restriction of the permissible maximum rotational speed and/or maximum power. The rotational speed characteristic line does then not need to be changed, but potentially just restricted or cut off in the upper area.

The adjustment of the operating parameter threshold value preferably takes place in the operation of the wind power plant. If, for example, only 50% of the created power of the wind power plant is supplied to a network due to restricted network capacity, an operating characteristic line could be provided in an operating mode outside of a performance-optimized normal operation, which provides for only 50% of the power with a corresponding rotational speed in a then adjusted rotational speed characteristic line. If then the network capacity increases again, any operating parameter threshold value, for example the rotational speed threshold value, can be increased somewhat again, since sufficient torque can be removed again from the system by the generator.

The operating modes with associated threshold values are preferably predetermined so that in the case of predefined conditions both the operating mode and the associated threshold value are switched.

The operating mode outside of the performance-optimized normal operation is preferably a performance-reduced and/or torque-reduced operation of the wind power plant. This mode is, for example, then provided when maintenance or repair work or in particular a sound-reduced operation is provided. A rotational-speed-reduced operating mode is preferably used for a sound-reduced operation.

The monitored operating parameter is preferably a rotational speed of the rotor, an acceleration of the rotor, a rotor blade adjustment angle, a rotor blade angle adjustment rate, a rotor blade adjustment angle acceleration, a rotor torque or an electrical output power. Accordingly, a threshold value is then provided for these respective monitored operating parameters. At least two operating parameters are preferably monitored and each compared with an associated operating parameter threshold value. This makes possible an even more secure method for the operation of a wind power plant. The braking process is then preferably only initiated when the at least two operating parameters reach their associated operating parameter threshold values. The braking process is, for example, only initiated when the rotational speed of the rotor exceeds a rotational speed threshold value and the rotor torque also exceeds a rotor torque threshold value.

The operating parameter threshold values are preferably adjusted at least partially independently of each other. Thus, it can be provided in the case of a coupling, for example, of the monitoring of the rotational speed of the rotor and the rotor torque and provision of the initiation of the braking process only upon the reaching of the two associated operating parameter threshold values that the respective threshold values are given somewhat higher than they would have been if only one of the two parameters had been monitored.

The invention is also solved by a wind power plant with a rotor, which has at least one angle-adjustable rotor blade, wherein the wind power plant includes an operating control system, which allows for at least a first operating mode and a second operating mode, wherein a safety system is provided for the monitoring of at least one operating parameter, wherein the safety system in the operating control system delivers a signal for the braking of the rotor and/or initiates the braking of the rotor as soon as the at least one operating parameter reaches an operating parameter threshold value, wherein the first operating mode is a performance-optimized normal operation and the second operating mode is a rotational-speed-reduced and/or performance-reduced operating mode, wherein the operating parameter threshold value in the first operating mode is different from the operating parameter threshold value in the second operating mode and/or that the operating parameter threshold value can be changed depending on the at least one operating parameter or an operating parameter not monitored by the safety system.

Within the scope of the invention, a differentiation of the operating parameter threshold value in the first operating mode from that in the second operating mode is in particular a difference in the amount of the threshold value. The safety system preferably includes a safety monitoring device and a safety chain. The operating parameter threshold value is preferably adjusted during operation.

An operating parameter is preferably a rotor rotational speed, wherein for the first operating mode, a first rotational speed switching device is provided in the safety system and for the second operating mode a second rotational speed switching device is provided in the safety system, wherein at least one of the rotational speed switching devices delivers the braking signal when a rotational speed threshold value assigned to the respective rotational speed switching device is exceeded.

A rotor blade angle adjustment rate is preferably an operating parameter. A rotor acceleration is preferably an operating parameter.

If preferably the rotor blade angle adjustment rate must reach a rotor blade angle adjustment rate threshold value and the rotor acceleration, a rotor acceleration threshold value in order to trigger the safety system to provide a braking signal or to initiate the braking of the rotor, a particularly safe wind power plant is given. The rotor blade angle adjustment rate threshold value preferably depends on the rotor acceleration threshold value. A dependency of the rotor acceleration threshold value on the rotor blade angle adjustment rate threshold value can also preferably be provided.

The invention is also solved by a wind power plant with a rotor, which has at least one angle-adjustable rotor blade, wherein the wind power plant includes an operating control system, which allows for at least a first operating mode and a second operating mode, wherein a safety system is provided for the monitoring of at least one operating parameter, wherein the safety system in the operating control system delivers a signal for the braking of the rotor and/or initiates the braking of the rotor as soon as the at least one operating parameter reaches an operating parameter threshold value, wherein the first operating mode is a performance-optimized normal operation and the second operating mode is a rotational-speed-reduced and/or performance-reduced operating mode, wherein at least one acceleration sensor is provided, which measures a rotor acceleration as an operating parameter in the first and/or second operating mode, wherein the safety system delivers the signal to brake the rotor or to initiate the braking of the rotor when a rotor acceleration threshold value is exceeded. The wind power plant can hereby be operated in a very safe manner.

A sensor for the operating parameter is preferably provided in the safety system, in particular in a safety chain. The safety system is preferably independent of the operating control system so that in particular no intervention of the operating control system in the safety system or no skipping of the safety system by the operating control system is possible. Thus, if the safety system generates a braking signal or the braking of the rotor is initiated, it is not possible for the operating control system to prevent this braking.

The safety system or parts of it are preferably arranged in a blade angle adjustment actuator or blade angle adjustment controller.

A control or regulation device of a wind power plant, on which the method according to the invention can be performed, is preferably provided. A computer program with program code means, which are adjusted in order to execute the method according to the invention, is preferably provided when the computer program runs in particular in a control or regulation device of the wind power plant.

The preferred computer program is preferably saved on a data carrier readable by a computer.

The invention is described below, without restricting the general intent of the invention, based on exemplary embodiments in reference to the drawings, whereby we expressly refer to the drawings with regard to all details according to the invention that are not explained in greater detail in the text.

BRIEF DESCRIPTION OF THE DRAWINGS

FIG. 5a shows a diagram of a rotor rotational speed over time, FIG. 5b shows a diagram of a filtered rotor acceleration over time, FIG. 5c shows a diagram of a rotor blade angle adjustment rate over time, FIG. 5d shows a schematic representation of the blade root bending moment applied over time.

DETAILED DESCRIPTION OF THE INVENTION

In the following figures, the same or similar types of elements or corresponding parts are provided with the same reference numbers in order to prevent the item from needing to be reintroduced.

Figure 1:
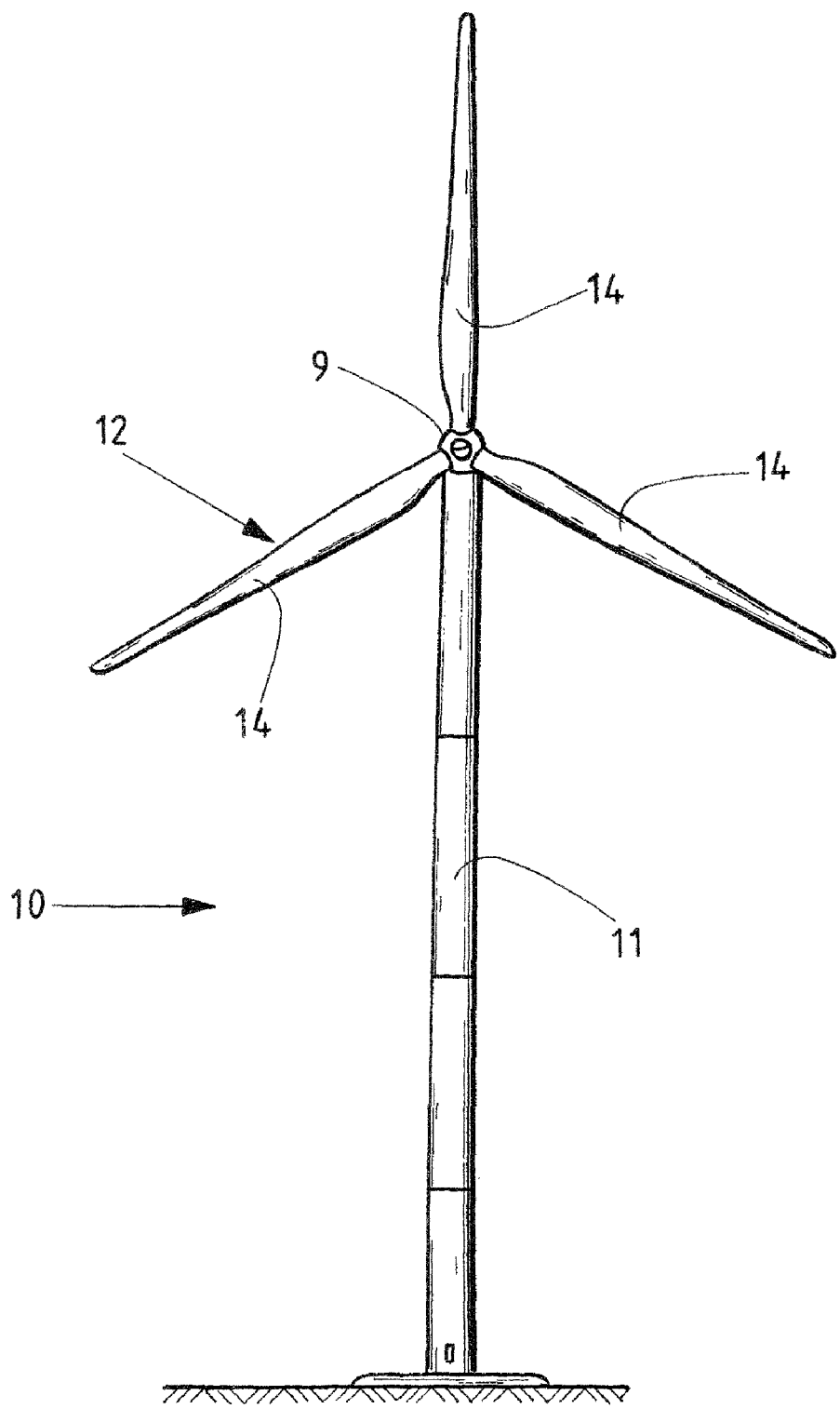
FIG. 1 shows a schematic representation of a wind power plant.

FIG. 1 shows a schematic representation of a wind power plant 10. The wind power plant 10 has a tower 11 and a rotor 12, which comprises three rotor blades 14, which are attached to a rotor hub 9. When the wind blows, the rotor 12 turns in a known manner. Power from a generator connected to the rotor 12 or via the rotor hub 9 can hereby be generated and delivered to a consumer network.

Figure 2:
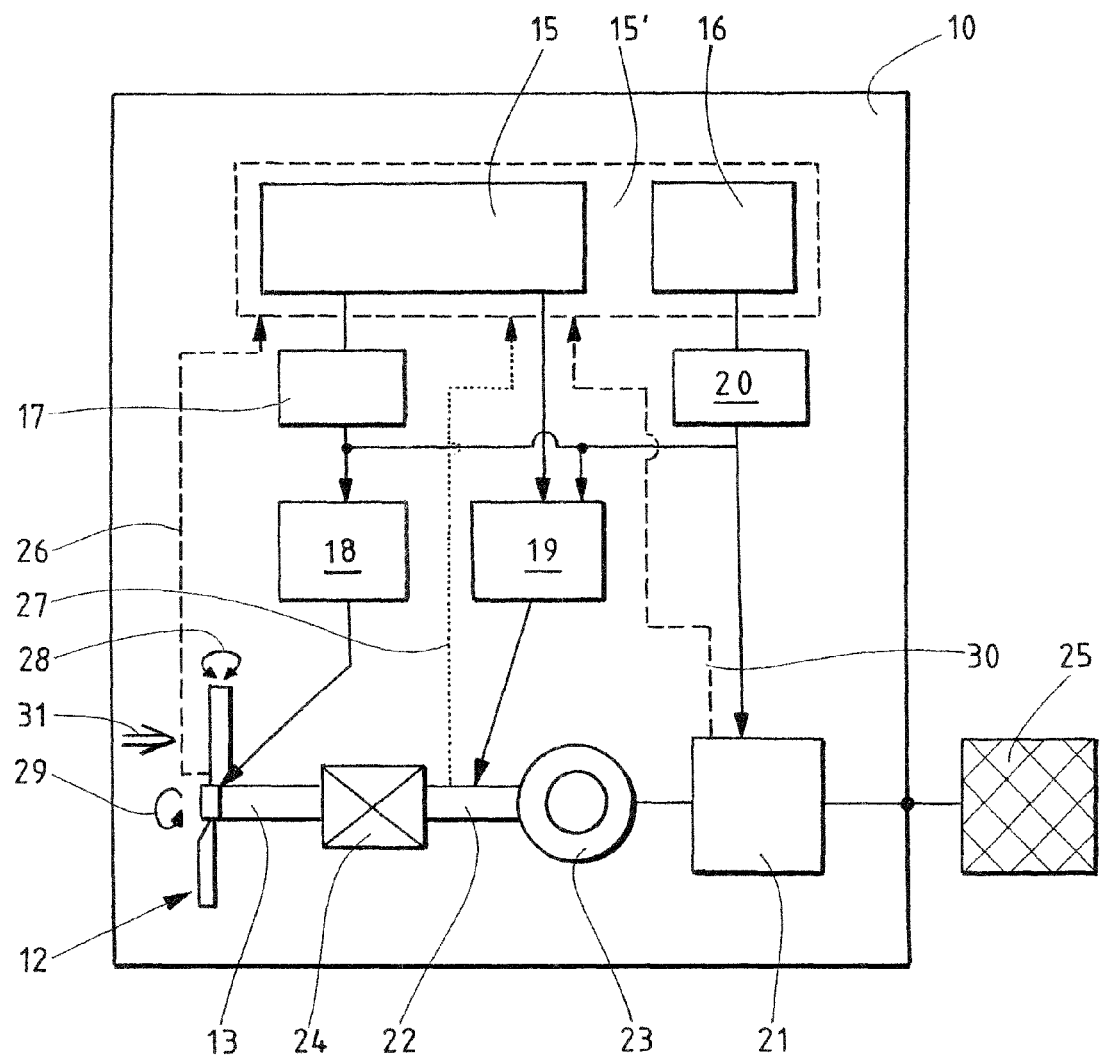
FIG. 2 shows a schematic block diagram of the main components of a wind power plant.

FIG. 2 shows a schematic view of main components of a wind power plant 10. An operating control 15, which can also be called the operating control device or the operating control system, controls and/or regulates the operation of the wind power plant 10. A safety monitoring device 16, which is connected with a safety chain 20, is attached to the operating control system 15. The safety monitoring device 16 can be designed in the form of a control unit independent of the operating control system; it can also be entirely or partially arranged in an already existing control device, for example a control computer arranged in the rotor hub for the blade angle adjustment. The safety chain 20 comprises, for example, a vibration detector, a manual (emergency off) switch and a rotational speed switch relay or a rotational speed switch. Further explanations for the safety chain are provided with reference to FIG. 3.

The safety chain 20 serves to shutdown the wind power plant to a non-critical state in the case of the occurrence of a safety-relevant event, for example for large vibrations or the activation of the emergency off switch by operating personnel. The safety chain 20 can be designed as a hardware chain. In the case of the triggering of the safety chain 20, the generator 23 is removed from the network 25, which is indicated by the arrow to the electrical components 21 and the rotor shaft 13 or the fast shaft 22 is braked, for example via the blade adjustment 18 or the mechanical brake 19 or also, which is not shown, immediately bypassing one or more regulation or control devices such as the blade adjustment 18.

This safety monitoring 16 can also be designed such that it checks the operating control 15 for functionality. The safety monitoring 16 is, thus, preferably designed as a type of watch dog. The operating control system can be designed as an operating control system with safety monitoring device 15'. This is shown by the dashed lines. The operating control system 15' hereby also includes an integrated safety monitoring 16 or safety monitoring device 16. The operating control system 15 or 15' is connected with a controller 17 and the blade adjustment 18 and also with the mechanical brake 19 via corresponding electronic data lines. Blade adjustment 18 is in particular an actuator, which ensures the angle adjustment of the rotor blades 14. Accordingly, a mechanical brake 19 is an actuator, which makes sure that the mechanical brake 19 in this exemplary embodiment affects the fast shaft 22. The mechanical brake or another mechanical brake 19 can affect the rotor shaft 13, but this is not shown.

Reference number 26 indicates a data connection, which conveys a rotor blade angle or the rotor blade angles of the rotor blades 14 to the operating control system 15 or 15'. Reference number 27 shows a data connection, which conveys an actual rotational speed of the fast shaft 22 to the operating control system 15 or 15'. Reference number 30 indicates a data line, which conveys an interference signal, which is emitted by electrical components 21 in this exemplary embodiment, to operating control system 15 or 15'.

The wind power plant 10 operates as follows. The rotor 12 is turned according to the rotation direction 29 when the wind 31 blows. The rotor shaft 13 thus also turns, which turns the fast shaft 22 with a gearbox 24 in a transmission ratio of 1:100, for example. This generates an electrical voltage in generator 23, which is regulated, converted and/or transformed into an alternating voltage in the electrical components 21. At the outlet of the electrical components 21, a connection to the network 25 is provided, with which the consumers are supplied with voltage or electrical power. Generally, known regulation and management concepts for wind power plants are, for example, disclosed in chapter 5 of the textbook entitled "Windkraftanlagen Systemauslegung, Netzintegration und Regelung" (Wind Power Plants, System Design, Grid Integration and Control) by Siegfried Heier, 4$^{th}$ Edition, February 2005, B.G Teubner-Verlag/GWV Fachverlage GmbH, Wiesbaden.

Figure 3:
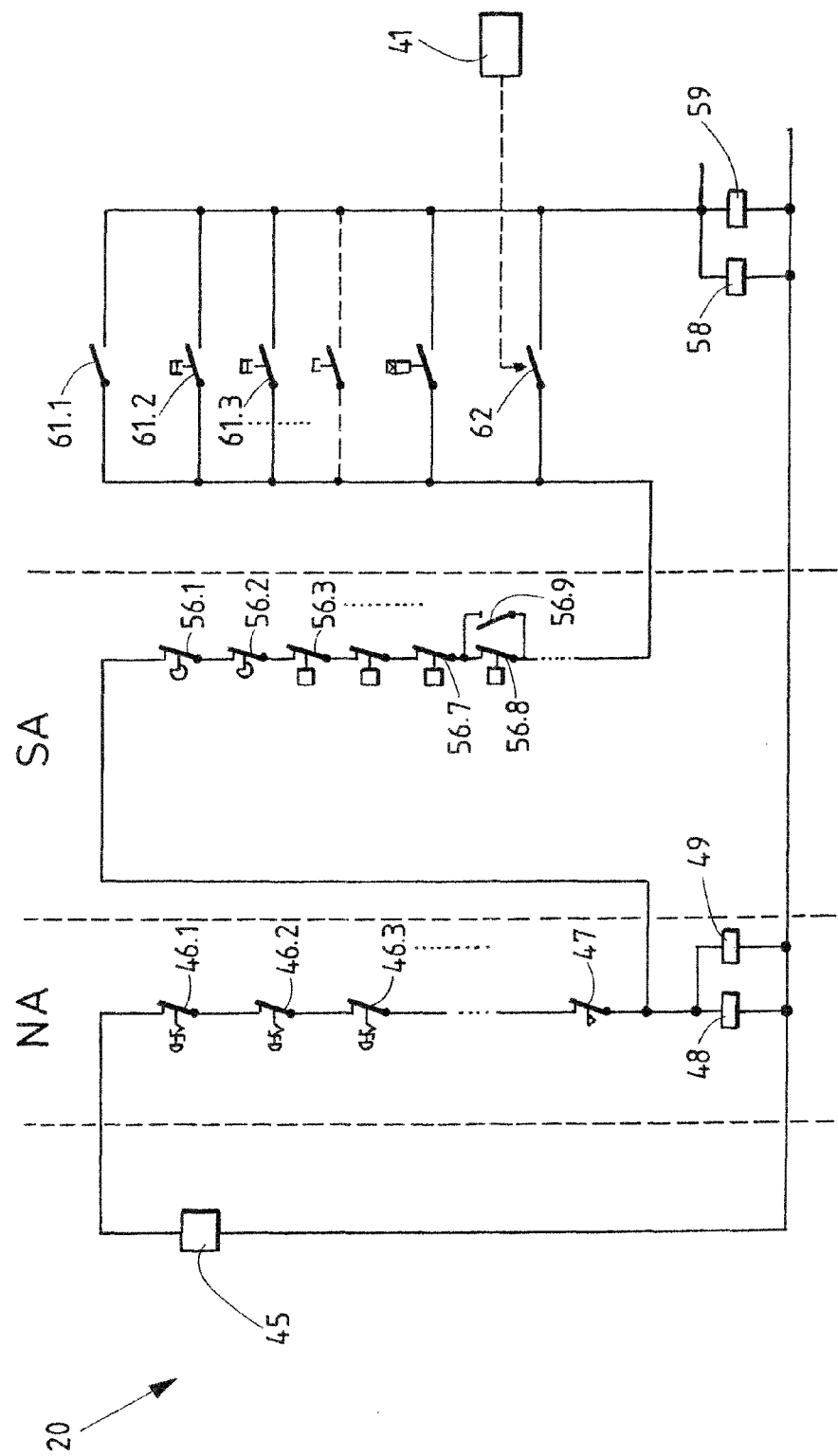
FIG. 3 shows a schematic circuit diagram of a safety chain.

The safety chain 20 is shown schematically in FIG. 3. A power supply 45 first serves to supply the corresponding components of the safety chain 20 with power. The safety chain 20 comprises an emergency shutdown device NA and a safety shutdown device SA. The emergency shutdown device NA comprises several emergency shutdown switches 46.1, 46.2 and 46.3, which can be operated by operating personnel if an emergency shutdown is necessary. These emergency shutdown switches are series-connected manual switches, which are arranged as an emergency off button on a top box, on a ground box, in the tower base and on the converter cabinet and at any other location on and in the wind power plant. Moreover, another key-operated switch 47 is series-connected to the other manually activatable switches 46.1 through 46.3, which is activated by means of a corresponding key by maintenance personnel. This type of key-operated switch 47, also called a service switch, is for example, provided in the top box (control cabinet in the nacelle) for the maintenance of the blade adjustment device.

The emergency shutdown device NA shuts down all live parts and all rotating parts of the wind power plant 10. The live parts are rendered voltage-free if possible upon activation of the emergency shutdown device NA. The switches are opened through activation of one of the switches 46.1, 46.2, 46.3, ..., 47 so that a safety shutdown of the wind power plant 10 takes place. This "emergency off" opens the connected relays 48, 49 (failsafe arrangement).

When the loop is, interrupted, the self-holding relays 48, 49 fall so that a safety shutdown takes place. The relays 48, 49, for example, hereby control the brakes of the wind power plant and trigger, for example, a brake program.

Furthermore, additional switches 56.1, 56.2, 56.3, ... of a safety shutdown device SA are provided in series to the manually activatable switches 46.1, 46.2, 46.3 ..., 47, wherein the switches of the safety shutdown device SA are switched by means of sensors. The sensors for the switches 56.1, 56.2, 56.3, ... monitor moving parts or suchlike in the machine. For example, the cable twisting (clockwise and counter-clockwise) is monitored by means of two sensors. Moreover, a constant check of the vibration, the rotational speed (overspeed) of the rotor and the gearbox and a monitoring of the operating control system (watch dog) take place.

For the monitoring of the rotational speed of the rotor 20 in normal operation, i.e. in an operation on a characteristic line, which provides for a performance-optimized operation, a first rotational speed switch 56.7 is provided, which provides for example for a shutdown or switchoff when the rotational speed exceeds a threshold value, which typically lies in the range of 20% above the rated speed. Additionally, according to the invention, a second rotational speed switch 56.8 is now provided in series to the first rotational speed switch 56.7, which is triggered when a second rotational speed threshold is exceeded. According to the invention, the second rotational speed threshold is arranged below the first rotational speed threshold, for example preferably in the range between 5 and 10% above the rated speed.

As long as the wind power plant is in a performance-optimized operating mode, i.e. in normal operation, the second rotational speed switch 56.8 is short-circuited by a bridging switch 56.9. Only in another operating mode, which is different from the performance-optimized operating mode, is the short-circuiting ended by the bridging switch 56.9.

The second rotational speed switch 56.8 and if applicable the bridging switch 56.9 can be arranged in the hub 9. Advantageously, the controller 17 and the blade adjustment 18 are then also arranged in the hub. A signal that dominates the first operating mode is then forwarded from the operating control 15, 15' or the safety monitoring device 16 over a slip ring or wirelessly to the second rotational speed switch 56.8, so that the second rotational speed switch 56.8 is inactive. Only when the signal is interrupted is the rotational speed switch 56.8 switched active so that immediately upon exceedance of the second rotational speed threshold value, the controller or the controller system 17 for the rotor blade angle adjustment and/or the blade adjustment or an actuator for the blade adjustment can be activated and an adjustment of the rotor blades can take place in the direction of a feathering position. The signal is preferably missing as long as the second operating mode predominates. A failsafe arrangement is thereby given. The risk that the rotational speed switch 56.8 is deactivated by an error in the operating control although the switch to normal operation did not take place properly can be avoided through time-delayed switching of the rotational speed switch 56.8. Should a failure result due to an error in the operating control system 15, 15' or the safety monitoring device 16, the critical situation occurs after just a few seconds. If accordingly the deactivation is generally delayed by for example 15-30 seconds, which can be taken into consideration by the operating control, this type of error can be safely prevented. The activation of the rotational speed switch 56.8 takes place without delay.

The self-holding relay 61.1 and various reset switches 61.2, 61.3, ... are switched parallel to each other in series with respect to the switches 46.1, 46.2, 46.3, ..., 47 and the other switches 56.1, 56.2, 56.3, ..., 46.7, 46.8 in order to enable the restart of the wind power plant after a safety shutdown by the emergency shutdown device NA or the safety shutdown device SA. Various reset switches 61.2, 61.3, ... are provided for this. The reset switches 61.2, 61.3, ... can be designed both as mechanically activatable switches at the appropriate locations, for example in a top box or in a ground box.

Moreover, there is also a reset switch for a network return. The self-holding switch or the self-holding relay 61.1 is closed during the proper operation of the wind power plant. FIG. 3 shows the safety chain 20 in a disconnected state. Moreover, a reset switch 62 is provided, which is switched remotely by means of a control device 41 of a remote monitoring control center indicated in FIG. 3. Through activation of the sensor-switched switches 56.1, 56.2, 56.3, 56.7 or 56.8, a safety shutdown is executed in that the relays 58, 59 drop away so that the wind power plant can be directed to a safe operation. Corresponding brake programs are then executed for the parts of the wind power plant 10.

According to the invention, the rotor acceleration is monitored. A shutdown criterion or a triggering of the braking of the rotor can be, for example, a rotor acceleration, which has a threshold value of 0.6 rpm/s in the case of a 5 MW wind power plant with a rotor diameter of 126 m. It is preferred when a combined monitoring of the rotor acceleration and the rotor blade angle adjustment rate is provided, for example a rotor acceleration threshold value of 0.45 rpm/s, a threshold value for the rotor blade angle adjustment rate of $-1°/s$. If a rotor blade can no longer be turned, a safe criterion can also be created in that the threshold value of the rotor acceleration is at 0.6 rpm/s and the threshold value of the rotor blade angle adjustment rate is at $0°/s$. Thus, in comparison to the aforementioned example of the acceleration threshold value of 0.45 rpm/s in the case of an adjustment rate threshold value of $-1°/s$, an adjustment of the acceleration threshold value to 0.6 rpm/s has taken place in order to thus realize the desired threshold value of the rotor blade angle adjustment rate of $0°/s$ for the monitoring of a blocked blade adjustment drive. The safety level for the securing of impermissible faults due to rotor overspeed has thus almost remained the same and can only be determined through conventional simulation calculations.

It is also possible to monitor the rotor acceleration alone.

Figure 4:
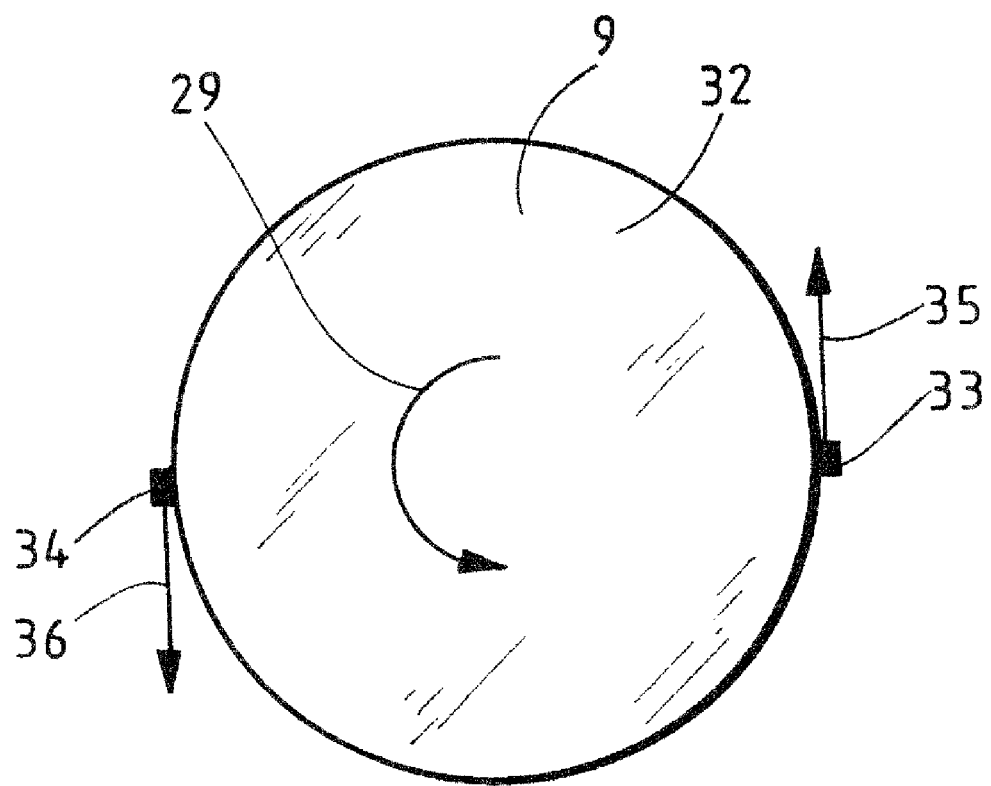
FIG. 4 shows a schematic representation of the arrangement of acceleration sensors.

The rotor acceleration can for example be determined using acceleration sensors or calculated from a rotational speed signal or rotor position signals. For example, the arrangement of two acceleration sensors 33, 34 can be provided on a rotor shaft 32 for the rotor acceleration determination, as shown in FIG. 4. Instead of the arrangement on the rotor shaft 32, the sensors 33 and 34 can also be arranged on the hub. The tangential acceleration can also be measured at the blade connection for the measurement of the rotor acceleration 35 or 36. This can be converted through division by the radius into an angle acceleration. In order to shut down the gravitational and tower head accelerations, for example, transverse accelerations, pitching, rolling and torsion through the measurement, it is preferred to arrange two acceleration sensors 33 and 34 offset by 180°. An addition of the two signals neutralizes undesired acceleration shares. For a trigger value or threshold value of 0.45 rpm/s, a corresponding tangential acceleration of 0.075 $m/s^2$ results for a rotor radius of 1.6 m. In this case, a measurement area of approx. $\pm 15$ $m/s^2$ is provided. The measured rotor acceleration is preferably filtered. Unnecessary shutdowns or braking processes of the rotor can hereby be avoided. The filtering is preferably a filter with a low pass with a $PT_1$ element with a time constant of 1 s.

In particular, in sound-reduced operation, that is in an operating mode with a reduced rotational speed, the invention can be used particularly well. The FIGS. 5a through 5d show diagrams of different parameters of a wind power plant applied over time. The behavior of the wind power plant in rotational-speed-reduced operation during the occurrence of a failure is shown. The time is applied in seconds. The figures each show three curves. The bold curve is the respective progression of the operating parameter with an operating control and a safety monitoring device, as known in the state of the art. The thin line represents an operating mode with a second safety monitoring device, in which the rotor acceleration and the rotor blade angle adjustment rate are monitored and a braking process is initiated when the two associated threshold values are reached. The dashed and dotted line represents an operating mode with a safety monitoring device, in which the rotational speed is monitored and a braking of the rotor is initiated when a reduced rotational speed threshold value is reached. The exemplary embodiments in FIG. 5 are all in a rotational-speed-reduced operating mode.

FIG. 5a shows the corresponding three diagrams as a function of the rotor rotational speed of the time. It can be seen that in the case of rotational-speed-reduced operation, the rotor rotational speed in the provided load case is at first constantly regulated for the reduced rotational speed specification, and then, for example in the case of a failure, which occurs at 20 s. and has a failure-determined maximum rotor blade angle adjustment rate, which is negative, thus increases to an angle of 0° (see FIG. 5c). It can be seen that the rotor rotational speed then increases and reaches approx. a maximum with approximately 20 revolutions per minute (rpm), and namely approximately 8 s. after the load case. In this case, the rotor rotational threshold value is reached in the normal operation and a braking process is initiated, so that the rotor rotational speed is reduced. This occurs through adjustment of the rotor blade angle, as can be seen in FIG. 5c.

In the case of the monitoring of the rotor acceleration together with the monitoring of the rotor blade angle adjustment rate, for example with the threshold values of a rotor acceleration of 0.45 rpm/s and a threshold value for the rotor blade angle adjustment rate of −1°/s, the result is a maximal achieved rotor rotational speed of approximately 10.5 rpm. In this case, braking occurs considerably earlier. The braking takes place somewhat later when a second rotational speed threshold value is provided, which lies below the first rotational speed threshold value, namely, for example, at approximately 18 rpm on the hub. In this case, braking is initiated after this threshold value is reached. This occurs at approx. 25 seconds in FIGS. 5a, 5b and 5c.

In FIG. 5b, a rotor acceleration filtered with a $PT_1$ element and a time constant of a second is applied over time, which results for the corresponding load case. It can also be seen here that, in the operation according to the state of the art, the rotor acceleration, which is applied in rpm/s, is relatively large. The increase in the rotor acceleration is considerably less developed in the case of the corresponding monitoring of the rotor acceleration and the rotor blade angle adjustment rate (thin line). In the case of the dashed and dotted line, namely in the case of the provision of a lower rotational speed threshold, the rotor is accelerated less than in the case of a known operating control.

The corresponding rotor blade angle adjustment rate is applied in °/s in FIG. 5c. It can be seen that the braking of the rotor is performed through the adjustment of the pitch rate (rotor blade angle adjustment rate). The pitch rate is set to 8°/s after the corresponding threshold values are reached, in order to brake the rotor. In the operation according to a known operating control, this occurs approx. 7 s. after the start of the failure at 20 s.

The fastest initiation of the braking process is reached with the thin line.

FIG. 5d shows schematically the blade root bending moment in kNm for the corresponding safety monitoring device. It can be clearly seen that considerably lower wind power plant loads prevail with the method according to the invention for the operation of the respective wind power plant.

A threshold value suitable for a 5 MW system would be e.g. 1,170 rpm generator-side, which corresponds with the rated speed in normal operation, for the monitoring of a reduced rotational speed level in a corresponding second operating mode with at least one second switchable rotational speed switching device 56.8. The first rotational speed threshold value in normal operation is then for example 1,250 rpm. A rotational-speed-reduced operating mode of rotational speeds between 870 to 1,100 rpm could then be safety monitored with the reduced second threshold value of 1,170 rpm.

The corresponding parameters are dependent on design data about the wind power plant and can be determined or adjusted for each system. This can take place through aeroelastic simulation calculations. Main influencing factors are hereby the rotor diameter, the aerodynamics of the rotor, the rotational inertia of rotor and drive train, properties of the blade adjustment system and the quality of the sensor signals.

The second rotational speed threshold value in the operating mode outside or below the performance-optimized normal operation should preferably lie approx. 5 to 9% or preferably 6 to 7% above the reduced rotational speed specification. In the case of conventional rotational speed reductions for sound reasons, this can lead to the fact that the second rotational speed threshold value lies exactly in the range of the rated speed in the performance-optimized normal operation. In the case of reduced rotational speed specifications in the rotational-speed-reduced operation, which lie considerably below the rated speed in the performance-optimized operation, the rotational speed threshold values—with respect to the reduced rotational speed specification—can also be considerably increased in relation to the reduced rotational speed specification. Thus, rotational speed threshold values can lie in the rotational-speed-reduced operation e.g. 30 to 40% above this reduced rotational speed specification, as long as the reduced rotational speed specification lies e.g. at only 75% of the rated speed in the performance-optimized normal operation, i.e. with respect to the rated speed in the performance-optimized operation, the rotational speed threshold values then lie slightly below or slightly above this rated speed.

According to the invention, the safety chain can be enhanced with further monitoring functions. The monitoring functions can be integrated in a pitch controller or a blade angle control or regulation device in the hub. An independent monitoring unit that has direct access to the rotor blade angle adjustment actuator can be provided.

An additional rotor acceleration switching device in hardware form could be incorporated into the safety chain. This rotor acceleration switching device records an, in particular filtered, rotor acceleration from the rotational speed signal. An evaluation can take place via an initiator plate or an incremental encoder.

A rotational speed switching device, which is activated through a status flag (status signal) can also be incorporated in the safety chain. This is essentially already indicated in FIG. 3. It can also be made possible that a control or regulation device independently detects a rotational-speed-variable operating mode or rotational-speed-reduced operating mode or an operating mode, which is reduced with respect to a performance-optimized normal mode. For this, two rotational speed switching devices can be provided in the hub, one of which is designed as a type of opener and one as a closer. The closer is hereby set to a rotational speed below the rated speed, for example, with a relatively long averaging time and thus switches to active the rotational speed switching device working as an opener in the case of a generally low rotational speed level or bridges this rotational speed switching device through closure in the case of a longer lasting high rotational speed level.

A monitoring of operating parameters in the controller 17 in FIG. 2 can also be provided. This controller 17 or pitch controller can be used as an independent system for the monitoring and permits direct access to the rotor blade angle adjustment actuator(s) 18 in FIG. 2.

Instead of the two sensors from FIG. 4, four sensors or uneven sensor numbers can also be used, in particular redundantly, which generate corresponding signals, which then serve to calculate the tangential acceleration of the rotor. Just one sensor could also be used if then the impact of the gravitation on the revolving hub is corrected along the rotor position and reducing malfunction accelerations are calculated from the vibration behavior of the system. A recording of the rotor acceleration using sensors on or in the hub is advantageous because this enables monitoring that is independent of the system control.

An additional rotational monitoring or an additional rotational speed switching device can also be provided in the rotor hub. For this, a rotational speed setpoint is transmitted as a signal to the controller 17, which is a rotor blade angle adjustment controller or a corresponding control device. A rotational speed actual value can be determined for the rotational speed monitoring in the controller 17.

In the case of the invention, it is advantageous that in the case of any rotational speed specification the permissible threshold value can also be adjusted, e.g. as a percentage specification, e.g. that the threshold value is 125% of the set rotational speed in this operating mode. Several specified threshold value stages can also be provided. For this, plausibility monitoring of the rotational speed threshold value that is transmitted can also preferably be provided. If no or implausible rotational speed threshold values are transmitted, a brake manoeuvre is initiated. The plausibility can be monitored via a maximum permissible deviation between the setpoint and actual value, a maximum upper limit of the setpoint and a maximum permissible acceleration or change rate of the setpoint. The corresponding measured values are to be filtered or averaged in order to eliminate individual false signals. For example, in order to prevent a time delay that is too long, it can be provided that as filtering one of the threshold values must be exceeded in only two subsequent rotational speed signals.

The activation of the monitoring can also be provided through a status flag (status signal) transmitted by the control or regulation or the operating control or the safety system via a slip ring, which is active if there is no signal (failsafe arrangement).

The second rotational speed switch 56.9 from FIG. 3 can preferably be deactivated with a unilateral time delay, for example with a time delay of 30 s. A corresponding rotational speed switching device can also be arranged in the hub.

Furthermore, an external specification module can be provided, with which rotational speed specifications are made available. This external specification module can then, for example, send a status flag or a status signal to the controller 17. The risk is hereby reduced in that the controller 17 executes a rotational speed reduction without the status flag having been set. The internal rotational speed specification can then also additionally be monitored.

Figure 6:
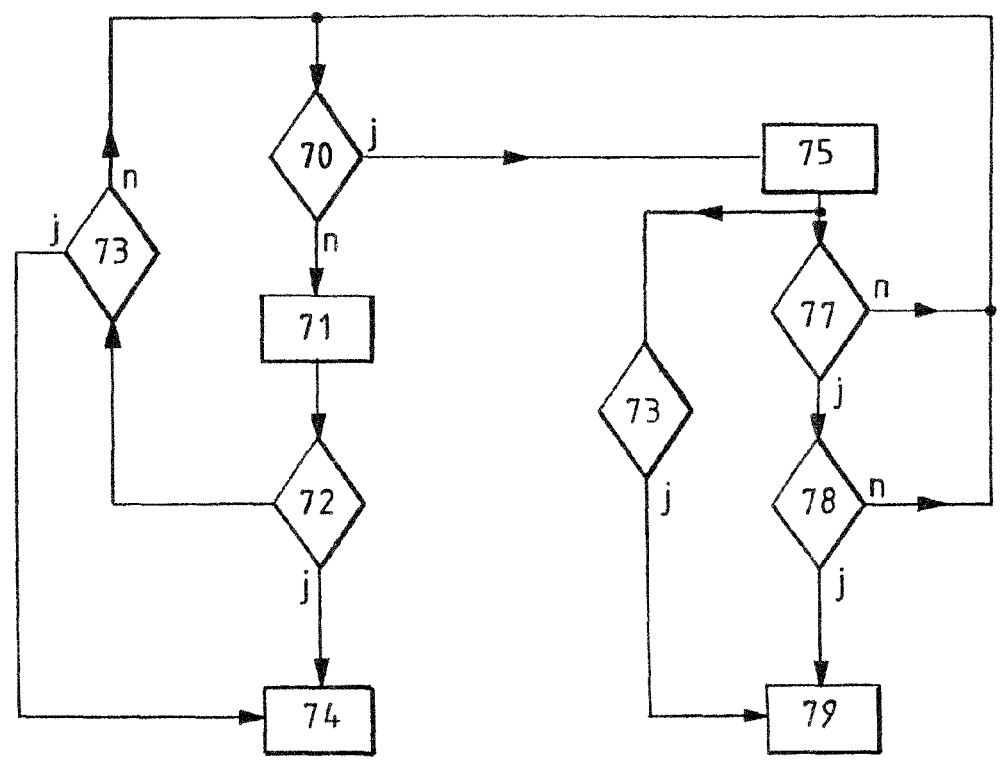
FIG. 6 shows a schematic process flow of a method according to the invention for the operation of a wind power plant and FIG. 7 shows a schematic process flow of an alternative method according to the invention for the operation of a wind power plant.

FIG. 6 shows a schematic block diagram of the process flow of the operation of a wind power plant. In the example in FIG. 6, it is queried at 70 whether there is a signal for the second operating mode. This can be a status flag, which was described above. A corresponding signal can be generated, for example, when it is identified that the network 25 can only accept a reduced power. A corresponding signal can also be generated when for example a rotational-speed-reduced operation is necessary in order to avoid sound disturbances, for example, in the night. If this query is answered with "no", which is indicated by n in FIG. 6, it is clear that the wind power plant is in performance-optimized normal operation at 71.

Next, it is queried whether the current rotational speed is greater than a first rotational speed threshold value. This occurs at 72. If the reply is negative, the aforementioned query is repeated at 80. If the reply is positive whether the rotational speed is greater than the first rotational speed threshold value, which is indicated with j in FIG. 6, the braking process is initiated at 74. This can occur through actuation of a mechanical brake or adjustment of the rotor blade angle to higher angles in the direction of a feathering position.

Before the recursion of the process from 72 to 70, it is still queried in 73 whether the rotor acceleration is greater than a rotor acceleration threshold value. If the reply is negative, the processing continues at 70. If the reply is positive, a braking process is initiated. If at 70 the query about whether there is a signal for the second operating mode is answered positively, the processing continues at 75, namely in the second operating mode, which can, for example, be a rotational-speed-reduced operating mode, in order to achieve, for example, sound reduction.

Next, it is then checked at 77 whether the current rotational speed is greater than a second rotational speed threshold value, which is lower than the first rotational speed threshold value. If the reply is positive, it is queried at 78 whether a rotor blade angle adjustment rate is smaller than a threshold value of a rotor blade angle adjustment rate. If the reply is positive, a braking process is initiated at 79.

If the reply to the previous query is negative, the process begins again at 70. Accordingly, the process also begins again at 70 if the reply to the query at 77 is negative.

According to the invention, instead of the AND link of the queries at 77 and 78, the query can also take place exclusively at 77 so that the query at 78 is dropped. As shown in FIG. 6, the query at 73 whether the rotor acceleration is greater than a rotor acceleration threshold value can also be performed parallel to the queries 77 and 78. If the reply is positive, the braking process is initiated independently of the reply at 77 and 78. If the reply at 73 is negative, the queries 77 and 78 are also performed independently of this.

Figure 7:
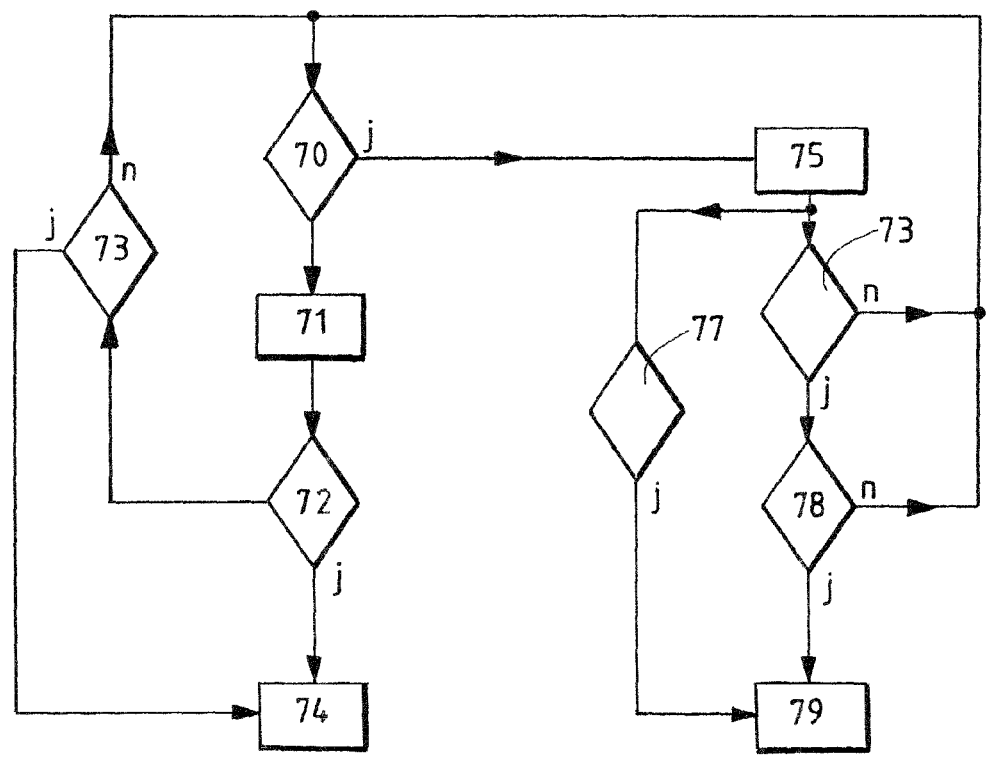

FIG. 7 shows a schematic process flow of a method according to the invention for the operation of a wind power plant in a design that is alternative to the process flow according to FIG. 6. In this case, the queries at 77 and 73 are transposed compared to FIG. 6. Thus, after the query at 70 whether there is a signal for the second operating mode and if the reply is positive, the process for 75 is performed in the second operating mode, for example a rotational-speed-reduced operating mode.

The following queries are then performed in parallel, namely at 77, whether the rotational speed is greater than the second rotational threshold value. If the reply is positive, braking occurs at 79. The other variant of the query according to FIG. 7 in the second operating mode 75 first occurs such that it is checked at 73 whether the rotor acceleration is greater than the rotor acceleration threshold value. If the reply is negative, a query whether there is a signal for the second operating mode is performed again at 70. However, if the reply to the query at 73 is positive, it is queried at 78 whether the blade angle adjustment rate is less than the blade angle adjustment rate threshold value. If the reply to this query is positive, braking takes place at 79. Thus, in the second operating mode, the operating control is based on the following logic that braking occurs when the second rotational speed threshold value is exceeded OR the rotor acceleration threshold value is exceeded AND the rotor blade angle adjustment rate threshold value is exceeded.

List References
9 Rotor hub
10 Wind power plant
11 Tower
12 Rotor
13 Rotor shaft
14 Rotor blade
15 Operating control system
15' Operating control system with safety monitoring device
16 Safety monitoring device
17 Controller
18 Blade adjustment
19 Mechanical brake
20 Safety chain
21 Electrical components
22 Fast shaft
23 Generator (with rotor and stator)
24 Gear box
25 Network
26 Data connection
27 Data connection
28 Angle adjustment
29 Rotation direction
30 Interference signal
31 Wind
32 Rotor shaft
33 Acceleration sensor
34 Acceleration sensor
35 Acceleration
36 Acceleration
41 Operating device
45 Power supply
46.1, 46.2, 46.3 Emergency shutdown switch
47 Key-operated switch
48 Relay (emergency off)
49 Relay (emergency off)
56.1, 56.2, 56.3 Sensor switch
56.7 First rotational speed switch
56.8 Second rotational speed switch
56.9 Bridging switch
58 Relay (safety off)
59 Relay (safety off)
61.1 Self-holding switch
61.2, 61.3 Reset switch
62 Reset switch
70 Signal for second operating mode present?
71 Performance-optimized normal operation
72 Rotational speed greater than first rotational speed threshold value?
73 Rotor acceleration greater than rotor acceleration threshold value?
74 Braking
75 Second operating mode
77 Rotational speed greater than second rotational speed threshold value?
78 Blade angle adjustment rate less than blade angle adjustment rate threshold value?
79 Braking
NA Emergency shutdown device
SA Safety shutdown device

The invention claimed is:

1. A method for the operation of a wind power plant (10) with a rotor (12), which has at least one angle-adjustable rotor blade (14), comprising the steps of:
   determining an operating parameter through a recording process,
   monitoring the operating parameter,
   operating the wind power plant (10) in a first operating mode (71) and a second operating mode (75), wherein the first operating mode (71) is a performance-optimized normal mode (71) and the second operating mode (75) is an operating mode outside of a performance-optimized mode (71) with a reduced rotational speed and/or with a reduced power; and
   upon reaching an operating parameter threshold value, initiating a braking process of the rotor (12),
   wherein in the second operating mode (75) the operating parameter threshold value and/or the recording process is adjusted in order to determine the operating parameter, or
   wherein the operating parameter is an acceleration of the rotor and in the first operating mode (71) and/or second operating mode (75) a braking process of the rotor (12) is initiated when a rotor acceleration prevails that is greater than a rotor acceleration threshold value.

2. The method according to claim 1,
   wherein the operating parameter is a rotational speed of the rotor (12),
   wherein in the first operating mode (71) a braking process of the rotor (12) is initiated when the rotational speed of the rotor (12) is greater than a first rotational speed threshold value,
   wherein in the second operating mode (75) a braking process of the rotor (12) is initiated when the rotational speed of the rotor (12) is greater than a second rotational speed threshold value,
   wherein the second rotational speed threshold value is less than the first rotational speed threshold value.

3. The method according to claim 2, wherein a rotor blade angle adjustment rate, in the second operating mode (75), is also monitored.

4. The method according to claim 3, wherein a braking process of the rotor (12) is initiated when the rotor blade angle adjustment rate reaches a rotor blade angle adjustment rate threshold.

5. The method according to claim 4, wherein the braking process is initiated in the case of the combination of the reaching of the rotor blade angle adjustment rate threshold value by the monitoring of the rotor blade angle adjustment rate with an exceedance of the second rotational speed threshold value by the rotational speed of the rotor (12) and/or with an exceedance of the rotor acceleration threshold value by the rotor acceleration.

6. The method according to claim 4, wherein the rotor blade angle adjustment rate threshold value is adjusted depending on the rotor acceleration threshold value and/or the second rotational speed threshold value.

7. The method according to claim 4, wherein the second rotational speed threshold value is adjusted depending on the rotor acceleration threshold value and/or the rotor blade angle adjustment rate threshold value.

8. The method according to claim 1, wherein the adjustment of the operating parameter threshold value occurs during operation of the wind power plant (10).

9. The method according to claim 1, wherein the second operating mode (75) is at least one of a rotational-speed-reduced, power-reduced and torque reduced operation of the wind power plant (10).

10. The method according to claim 1, wherein the monitored operating parameter is a rotational speed of the rotor (12), an acceleration of the rotor (12), a rotor blade adjustment angle, a rotor blade angle adjustment rate, a rotor blade adjustment angle acceleration, a rotor torque, or an electrical output power.

11. The method according to claim 1, wherein at least two operating parameters are monitored and compared with the respective associated operating parameter threshold value.

12. The method according to claim 11, wherein the braking process is only initiated when the at least two operating parameters reach their respective associated operating parameter threshold values.

13. The method according to claim 11, wherein the operating parameter threshold values are adjusted at least partially dependently on each other.

14. A control or regulation device for a wind power plant (10), on which a method can be performed according to claim 1.

15. Computer program with program code means, which are adjusted, in order to execute the method according to claim 1, when the computer program runs in the control or regulation device of a wind power plant (10).

16. Computer program according to claim 15, wherein the computer program is saved on a data carrier readable by a computer.

17. The method according to claim 1, wherein the operating parameter is monitored through a safety system independent of an operating control system.

18. A wind power plant (10) with a rotor (12), which has at least one angle-adjustable rotor blade (14), wherein the wind power plant (10) comprises:
an operating control system (15), which provides for at least a first operating mode (71) and a second operating mode (75),
wherein a safety system (16, 20) is provided for the monitoring of at least one operating parameter,
wherein the safety system (16, 20) in the operating control system (15) delivers a signal for the braking of the rotor (12) and/or initiates the braking of the rotor (12) as soon as the at least one operating parameter reaches an operating parameter threshold value,
wherein the first operating mode (71) is a performance-optimized normal operation and the second operating mode (75) is a rotational-speed-reduced and/or performance-reduced operating mode, wherein the second operating mode (75) is an operating mode outside of a performance-optimized mode;
wherein the operating parameter threshold value in the first operating mode (71) is different from the operating parameter threshold value in the second operating mode (75) and/or that the operating parameter threshold value can be changed depending on the at least one operating parameter or an operating parameter not monitored by the safety system (16, 20) or wherein at least one acceleration sensor (33, 34) or rotational speed sensor is provided, which measures, or calculates in the case of the rotational speed sensor, a rotor acceleration as an operating parameter in the first operating mode (71) and/or second operating mode (75), and
wherein upon exceedance of a rotor acceleration threshold value the safety system (16, 20) delivers the signal to brake the rotor (12) or initiates the braking of the rotor (12).

19. The wind power plant (10) according to claim 18, wherein an operating parameter is a rotor rotational speed, wherein for the first operating mode (71) a first rotational speed switching device (56.7) is provided in the safety system (16, 20) and for the second operating mode (75) a second rotational speed switching device (56.8) is provided in the safety system (16, 20), and wherein at least one of the rotational speed switching devices (56.7, 56.8) delivers the braking signal when the rotational speed threshold value assigned to the respective rotational speed switching device (56.7, 56.8) is exceeded.

20. The wind power plant (10) according to claim 19, wherein a sensor (56.1-56.3, 56.7, 56.8) is provided for the operating parameter in a safety chain (20).

21. The wind power plant (10) according to claim 19, wherein the safety system (16, 20) is independent of the operating control system (15).

22. The wind power plant (10) according to claim 19, wherein the safety system (16, 20) or parts of it are arranged in a blade angle adjustment actuator (18) or blade angle adjustment controller (17).

23. The wind power plant (10) according to claim 18, wherein a rotor blade angle adjustment is an operating parameter.

24. The wind power plant (10) according to claim 23, wherein the rotor blade angle adjustment rate must reach a rotor blade angle adjustment rate threshold value and the rotor acceleration must reach a rotor acceleration threshold value in order to allow the safety system (16, 20) to provide a braking signal or to initiate the braking of the rotor (12).

25. The wind power plant (10) according to claim 23, wherein the rotor blade angle adjustment rate threshold value depends on the rotor acceleration threshold value.

26. The wind power plant (10) according to claim 18, wherein a rotor acceleration is an operating parameter.

* * * * *